June 18, 1940. W. H. MAY 2,205,104
MOTOR VEHICLE THEFT PREVENTION DEVICE
Filed March 10, 1937
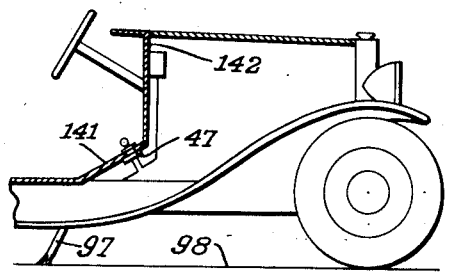
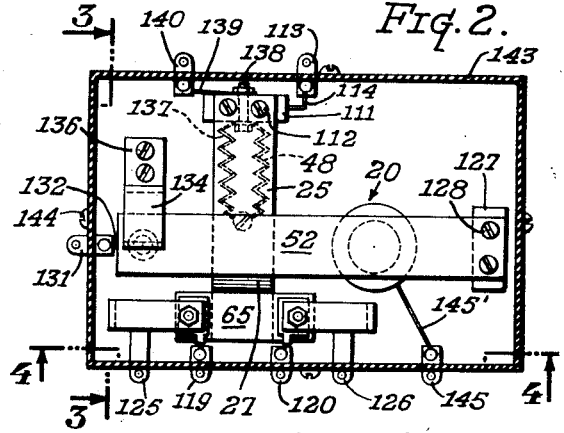
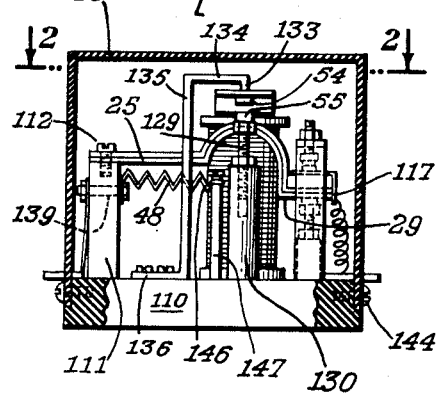
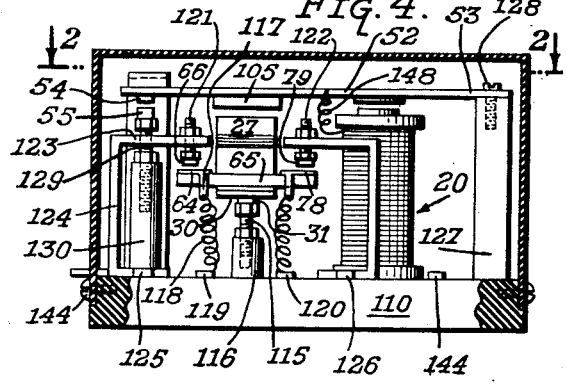
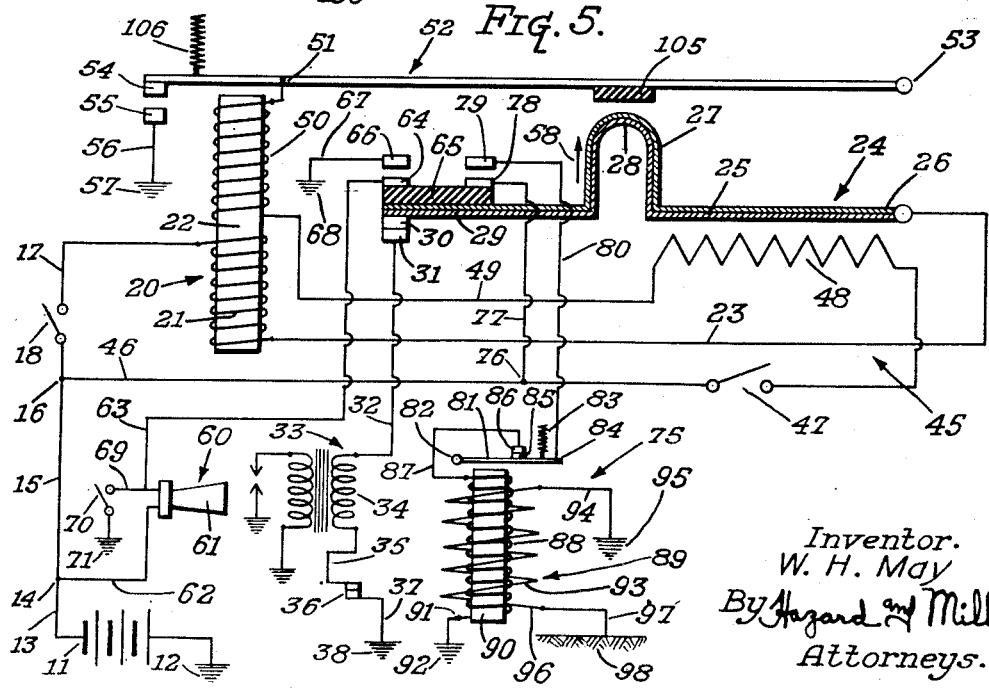
Inventor.
W. H. May
By Hazard and Miller
Attorneys.

Patented June 18, 1940

2,205,104

UNITED STATES PATENT OFFICE 2,205,104

MOTOR VEHICLE THEFT PREVENTION DEVICE

William H. May, Los Angeles, Calif., assignor of one-half to Marion J. Wilson, Los Angeles, Calif.

Application March 10, 1937, Serial No. 130,078

8 Claims. (Cl. 177—314)

I designate my invention as a theft prevention device for motor vehicles in that in the practical operation of the device the person stealing an automobile or taking the same for unauthorized use would have the ignition opened after the engine had been run for a short time, therefore the car in the ordinary circumstances would be brought to rest. In addition in order to give warning to the police or other parties the horn or other signal device would be operated in a continuous manner, thus the horn giving a continuous sound for a considerable length of time or some other signal would be given. In addition as a deterrent to a thief should he step on the ground and endeavor to examine the engine for instance by lifting the hood or touch a metal part while standing on the ground, he would receive a sharp electrical shock and thus deter such person from any attempts to find out the reason or mechanism by which the ignition was cut out and the horn or other signal sounded, or the cause for him obtaining an electric shock.

My invention considered somewhat in its broad aspects has among other objects to introduce a time delay switch in the low tension side of the ignition circuit of the internal combustion engine used in most automobiles whereby when such engine is used by an unauthorized person for a more or less predetermined time, the time delay switch opens and thus breaks the ignition circuit. Complementary with this another object and feature of my invention involves the time delay switch when opening, energizing a signal such as a horn and a further feature of my invention involves the generation of a high potential circuit charging the metal parts of the vehicle with a ground connection so that a person contacting the ground and touching a metal part receives an electric shock.

Considered more specifically, a further and more detailed object and feature of my invention is providing the time delay switch of a thermostat type in which a bi-metallic thermostatic strip of metal is electrically heated by a circuit in parallel with the ignition circuit. This thermostatic switch in its normal operation maintains the low tension side of the ignition circuit closed and by closing an anti-theft control switch, the heating circuit may be energized. Therefore for instance the owner of a motor vehicle when leaving the same can close this control switch. Hence when the engine is operated for a substantially predetermined time a heating coil positioned to heat the thermostatic switch causes this to open thereby breaking the low tension side of the ignition circuit. A further object and feature of my invention consists in wiring connections for a signal such as a horn which are normally open and are closed when the thermostat switch opens the ignition circuit, thus giving a continuous energizing of the warning signal. Another detailed object is providing a high tension transformer preferably of a vibrator type energized by the battery of the vehicle, the circuit to which is closed on the opening of the time delay thermostatic switch. The secondary of the vibrator transformer has one side grounded to a metal part of the vehicle and the other side connected to the ground or roadway. This may be done by a dragging brush. Hence a person standing on the ground and touching a metal part of the vehicle receives a shock of the high tension secondary current from the shock coil.

A third characteristic feature and object of my invention is that after the thermostatic switch is open thus opening the ignition circuit and the signal circuit and the shock coil circuit are closed, that under the influence of the heat from the heat coil the thermostatic switch opens an electro-magnetic switch and thus breaks the ground connection of the heating circuit. For convenience this electro-magnetic switch is energized by the low tension side of the ignition circuit so that the electro-magnet normally holds the electro-magnetic switch closed. This gives a circuit through an additional winding on the electro-magnet, this additional winding having a connection through the electro-magnetic switch to ground and thus establishing the return connection for the heating coil circuit. Therefore even if the ignition circuit is opened, the warning signal is energized and the shock coil is also energized until the thermostatic strip of the thermostatic switch is heated sufficiently to open the heating coil circuit.

Another object and feature of my invention resides in the characteristics of the thermostat switch that when its thermostatic strip cools it automatically opens the warning signal circuit and the shock coil circuit and closes the ignition circuit. However should a person attempt to operate the engine and move the vehicle, the thermostatic switch will again function to open the ignition circuit and the warning signal will be given and the shock coil energized.

My invention is illustrated in connection with the accompanying drawing, in which:

Fig. 1 is a longitudinal section through part of an automobile illustrating a location for assembling the switches, etc. utilized in my invention.

Fig. 2 is a horizontal section on the line 2—2 of Figs. 3 and 4 of the switch assembly.

Fig. 3 is a transverse section on the line 3—3 of Fig. 2 in the direction of the arrows.

Fig. 4 is a longitudinal section on the line 4—4 of Fig. 2 in the direction of the arrows.

Fig. 5 is an electric and mechanical diagram illustrating the various electrical circuits and the various automatic switches.

In considering my invention, the diagram of Fig. 5 will be first described to show the general equipment required. The battery or other source of power is indicated by the numeral 11 having one side grounded as indicated at 12 to a metal part of the vehicle. The ignition circuit may be traced as follows: This employs a lead 13 from the battery through a connection 14, a second lead 15 through a second connection 16, a third lead 17 including a standard ignition switch 18. The lead 17 connects to an electro-magnet 20. This has a first winding 21 and is illustrated as having a metal core 22. From the electro-magnet there is a lead 23 to the thermostatic time delay switch 24. This is illustrated as having bi-metallic thermostatic strips 25 having one end 26 secured, the lead 23 connecting to the strips in the fixed end 26. To make a more effective operation of the thermostat, this is provided with a U shaped bend 27, the upper portion 28 of which has a switch opening function as hereinunder detailed. The free end 29 of the thermostatic strip has a first contact 30 on its underside which normally engages an adjustable contact 31. From this latter there is a lead 32 to an ignition transformer 33. In this the low tension coil is illustrated at 34 from which a lead 35 passes through the breaker points 36 of the timer of the vehicle from which there is a connection 37 to a grounding 38 on the metal of the vehicle. This circuit gives an ignition circuit for supplying the spark plugs of the engine with energy for the normal operation of the engine.

The thermostat heating control circuit designated by the assembly numeral 45 includes a lead 46 from the junction 16 of leads 13, 15 and 17 from the battery through the control switch 47. The heating coil 48 positioned adjacent a part of the bi-metallic thermostat strip through the lead 49, a second winding 50 on the electro-magnet 20, a connection at 51 to the armature 52 of this electro-magnet. Such armature is indicated as pivoted at 53 and has at least its outer end formed of conducting material with a contact 54 at its outer end which may be brought into engagement with an adjustable contact 55 from which there is a lead 56 to a ground 57 to a metal part of the vehicle. Thus when the control switch 47 is closed and the engine is running with the ignition switch closed, the heating current through the circuit 45 is parallel to the ignition circuit described above.

The action of the ignition current passing through the coil 21 on the electro-magnet 20 in creating a magnetic field in the core 22 is to attract the armature 52 closing the contacts 54 and 55. These are thus closed when the engine is running, no matter whether the control switch 47 is open or closed. Therefore when this switch is closed the heating circuit 45 has its ground connection through the contacts 54 and 55 and the ground 57 to a metal part of the vehicle. The heat generated by the heating coil or other heating device 48 heats the thermostatic strip and causes the outer end of this to move upwardly in the direction of the arrow 58. It requires a more or less predetermined time to sufficiently heat this strip to break the contacts 30 and 31 of the ignition circuit thereby opening such circuit and thus stopping the operation of the motor.

The signal or warning circuit designated by the assembly numeral 60 includes a horn 61 or other signal device which has a lead 62 from the junction 14 in the battery lead 13, a lead 63 from the horn to a moving contact 64 mounted on an insulating block 65 on the outer end of the thermostatic strip. When this strip is heated and flexes upwardly this contact engages an adjustable signal contact 66 from which there is a lead 67 to a ground connection 68 on the metal parts of the vehicle. In order that the horn or other signal may be manually operated a connection 69 extends from the horn and includes the horn switch or button 70 which has a ground connection at 71 to a metal part of the vehicle. Therefore even after the ignition circuit is opened the winding 50 of the electro-magnet 20 holds the armature 52 downwardly engaging the contacts 54 and 55 and thus maintaining the heating circuit, hence causing the contacts 64 and 66 to engage and thus energize the horn or similar notice signal. It will be manifest that when the horn is not energized in this manner that it may be sounded in the usual way by the conventional push button switch 70.

The shock coil circuit designated by the assembly numeral 75 includes a junction 76 in the heating coil lead 46, a lead 77 from this junction to a moving contact 78 on the insulating block 65 at the outer end of the thermostatic strip. As this block moves upwardly due to the upward flexing of the heating thermostatic strip the closed circuit is made with the adjustable contact 79 from which there is a lead 80 to a vibrator armature 81. This armature is indicated as pivoted at 82 and normally held upwardly by a tension spring 83. The lead 80 is indicated as connected to this armature at 84 and has a contact 85 thereon which when in closed circuit position, engages the adjustable contact 86 from which there is a lead 87 to the primary winding 88 of a shock coil 89. This coil is indicated as having a metal core 90 and from the primary winding there is a lead 91 to a ground connection 92 in the metal part of the vehicle.

When the primary coil 88 is energized it attracts the armature breaking the contacts at 85 and 86, the spring retracts the armature and again establishes the circuit, this being the usual type of high tension transformer. The secondary coil 93 of this transformer has a lead 94 grounded to a metal part 95 of the vehicle. The other end of the coil has a lead 96 to a brush 97 which forms a contact with the ground or earth 98. Therefore should the operator of the vehicle, the ignition circuit now being open and the engine stopped, step out of the vehicle and onto the ground to examine the engine or other parts of the vehicle to ascertain the trouble, due to the contact of his feet with the ground, then on touching a metal part of the vehicle such person will receive an intensive electric shock and this will be maintained as long as the contacts 78 and 79 are closed.

The opening of the warning signal and shock coil circuits results from the upward movement of the heated thermostatic strip in which the U shaped bent portion 27 having the contact part 28 engages an insulating block 105 mounted on the underside of the armature 52. Although the contacts 66 and 79 are adjustable, they are mounted on a relatively fixed structure. Therefore when the thermostatic strip flexes upwardly and the contacts 64 and 78 engage their complementary contacts 66 and 79 respectively, the outer end of the thermostatic strip is prevented from further upward movement. However the U shaped bent portion 27 can flex allowing the contact portion 28 to lift until it engages the insulating block 105. This then swings the armature 52 upwardly to a sufficient amount to open or break the heating circuit at the contacts 54 and 55 which manifestly de-energizes the winding 50 of the electro-magnet 20. The heating element 48 is thus de-energized and gradually cools and in its cooling the thermostatic strip also cools. This causes this to flex downwardly. The armature 52 normally has a tension to hold the contacts 54 and 55 open or else these are maintained normally open by a tension spring 106.

As the thermostatic strip cools it returns to its original position, opening the contacts 64 and 66 of the horn signal circuit 60 and also opening the contacts 78 and 79 of the shock coil circuit 75. Thus both the horn and the shock coil are de-energized and the ignition circuit contacts 30 and 31 again become closed. The engine may then be again started presuming the ignition switch is still closed and the control switch 47 also closed. Then after a more or less predetermined time the cycle of operations would be repeated, that is, the ignition circuit would first be opened, next the horn signal and the shock coil would be energized, then the heating circuit would be opened, etc. It is manifest that the control switch 47 should be located some place on the vehicle which would be unknown to the usual automobile thief, but also be in a position where it could be readily closed by the driver of the vehicle, thus should the driver be held up when driving on the highway, he might be able to kick this switch with his foot or otherwise close such control switch.

The physical set up of my invention may include any assembly of the various switch structures that would be suitable but to present an operative invention, show an embodiment of the main assembly in Figs. 2, 3 and 4 in which the various parts have numerals similar to those used in the diagram of Fig. 5. In these illustrations I employ an insulating base 110 on which at one side there is an insulating post 111 to the top of which the thermostatic strip 26 is secured by a screw 112. For convenience of assembly the outer portion 29 of this is located below the level of the top of the post 111. A terminal 113 with a short connecting wire 114 provide for connecting the wire lead 23 which may be carried in any suitable manner to the electro-magnet 20. The contact 30 is secured to the underside of the thermostatic strip and its complementary contact 31 is mounted on the top of a screw 115 which is adjustably mounted in a short post 116 having a threaded socket. This screw when adjusted as to height is secured by a lock nut. The transformer 33 of the ignition circuit is separate from this set up and hence is not illustrated nor are the details of the distributor and breaker points.

The block 65 is illustrated as being a bridging block of insulating material connected to the free end 29 of the thermostatic strip. The contact 64 is attached to one end of this bridging block and the contact 78 to the opposite side. Each of these has a depending tongue 117. Part of the wire leads 31 and 77 are illustrated by pigtail twists of wire 118 leading to terminals 119 and 120. The complementary upper contacts 66 and 79 are mounted on adjustable screws 121 and 122, each of which is adjustable in a horizontal arm 123 of a supporting bracket 124, the foot of the bracket being secured to the insulating base 110. Terminals 125 and 126 extend from the bottom or feet of these brackets and are used for the electric leads 67 and 80 respectively.

The armature 52 is illustrated as being mounted on an insulating post 127 secured to the insulating base 110, the end 53 of the armature being attached by a screw 128. This armature is if desired, self tensioned to open the contacts 54, 55 or may have a spring 106 as indicated in Fig. 5. The contact 54 is illustrated as being secured to the underside of the armature 52 and its complementary contact 55 is mounted on an adjustable screw 129 mounted on an insulating post 130 having a threaded socket. This screw may be locked by a lock nut. A terminal 131 connects by a short piece of wire 132 to the contact 55 and a lead such as 56 may be taken from this terminal to a ground connection as 57 on a metal part of the vehicle. The upward movement or deflection of the armature 52 is limited by a limiting finger 133 on the end of a horizontal arm 134, this being part of a bracket 135 having a foot 136 attached to the insulating base 110. The insulating block 105 is secured to the underside of the armature 52 positioned above the apex of the U shaped bend 27 of the thermostat bimetallic metal strip. The heating coils 48 are illustrated as being in parallel, having ends 137 connected together and attached to a conducting bolt 138. This bolt extends through the insulating block 111 and from the outer end there is a shorter wire 139 to a terminal 140 from which the lead 46 may extend. This lead has the control switch 47 mounted therein, such being shown as located in the floor board 141 of the driver's compartment of the vehicle. The base 110 with the various switch assemblies is illustrated as being on the forward side of the dash 142. This whole assembly of the various switch elements is enclosed by a box-like cover 143 attached by screws 144 to the insulating base 110. It is preferable that this cover be of insulating material and have slots for the various terminals extending outwardly from the box so constructed. The terminal 145 is for connecting the lead 17 and which extends by the lead 145' to the coil forming part of the electro-magnet 20. The upper coil 50 of Fig. 5 has a connection to the ends 146 of the heating coils 48, these being supported on a post 147 extending upwardly from the insulating base 110. The lead from the opposite end of the coil 50 to the connection 51 on the armature is indicated by the pigtail loop 148. The brush 97 to form the connection with the earth or ground is indicated as extending below the running board of the vehicle of Fig. 1 and will be connected to a high tension lead such as 96 from the high tension secondary of the shock coil 89. The ignition switch may be in the ordinary place and connected to the battery in a standard manner.

Various changes may be made in the details of the construction without departing from the spirit or scope of the invention as defined by the appended claims.

I claim:

1. In a device as described, an engine with an ignition low tension circuit including a battery, a lead therefrom to an ignition switch, a transformer having a primary winding and a connection from the primary winding to ground combined with a thermostat switch with one contact located in the low tension ignition circuit, an electromagnet having a first winding in the ignition circuit, an armature for the electromagnet, a heating circuit separate and distinct from the ignition circuit except for the said battery and said lead for the thermostat switch including a heating coil, a connection to said heating coil including a control switch to the battery and a connection through the armature when in a closed circuit position on energizing of the electromagnet to form a ground for the heating circuit whereby on opening of the thermostat switch due to the application of heat by the heating coil the ignition circuit is opened.

2. In a device as described and claimed in claim 1, a second winding on the electromagnet in the heating circuit to hold the armature in closed circuit position after opening of the ignition circuit and deenergizing of said first winding.

3. In a device as described and claimed in claim 1, a second winding on the electro-magnet in the heating circuit to hold the armature in closed circuit position after opening of the ignition circuit, a signal circuit having a signal device with a connection to the battery and a connection through contacts brought into closed circuit on the opening of the thermostat switch.

4. In a device as described and claimed in claim 1, a second winding on the electro-magnet in the heating circuit to hold the armature in closed circuit position after opening of the ignition circuit and a shock coil assembly including low and high tension windings and a circuit having a low tension connection from the battery through contacts closed on opening of the thermostat switch and vice versa, the high tension winding having one end grounded to the engine which is insulated from earth and the opposite end brush connected to earth.

5. In a device as described, an engine having an ignition circuit including a thermostat switch normally in closed circuit position but which when heated opens the ignition circuit, the combination of a heating circuit separate and distinct from the thermostat switch with a heating element positioned to heat the thermostat switch, a signal circuit with a signal device including a contact operatively connected to the thermostat switch but electrically insulated therefrom and a second fixed contact, a signal device electrically connected to one of the contacts, a ground connection to the other contact whereby the heating circuit on heating the thermostat causes a movement of the thermostat switch to open the ignition circuit and to close the contacts of the signal circuit and thereby give a signal.

6. In a device as described, an engine having an ignition circuit including a thermostat switch normally in closed circuit position but which when heated opens the ignition circuit, the combination of a heating circuit with means to heat the thermostat switch and thus produce a movement of such switch to open the ignition circuit, a shock coil circuit including a first contact operatively connected to the thermostat switch and a second fixed contact, the said shock coil circuit including a high tension shock coil assembly having one end of the secondary connected to the engine, such engine being insulated from earth and the other end of the secondary having a brush connection to earth whereby the heating of the thermostat switch causes a movement thereof and an opening of the ignition circuit and a closing of the two contacts of the shock coil circuit.

7. In a device as described, an engine with an ignition circuit having a low tension side, such side including a thermostat switch which is normally in closed circuit position but which when heated opens the ignition circuit combined with a heating circuit including a heating unit positioned to heat the thermostat switch, a signal circuit including a first contact operatively connected to the thermostat switch but electrically insulated therefrom and a second fixed contact, a signal device operatively connected to one of the contacts, the other contact being connected to ground, together with a shock coil circuit including a first contact operatively connected to the thermostat switch but electrically insulated therefrom and a second fixed contact, a shock coil assembly having a low and a high tension side, the low tension side having a connection to the two contacts of the shock coil circuit, the high tension side being provided with a ground connection to the engine, such engine being insulated from earth and a brush connection to the earth whereby on heating of the heating coil the thermostat switch is caused to move and open the ignition circuit and to close the contacts of the signal and the shock coil circuits.

8. In a device as described, the combination of an ignition circuit with high and low tension sides, including a thermostat switch on the low tension side, said switch having a bimetallic thermostat strip and a contact on one side positioned to normally engage a complementary contact of the low tension side of the ignition circuit, a heating coil having a heating coil circuit, such coil being positioned to heat the strip and thereby cause an opening of the thermostat switch, means to establish a ground connection for the heating coil circuit on energizing the ignition circuit, means to maintain the heating coil circuit closed after opening of the ignition circuit and a signal circuit with a signal device having a first contact on the thermostat strip but insulated therefrom and a complementary contact with a grounded connection whereby on the opening of the ignition circuit and the continued heating of the thermostat the signal circuit is closed.

WILLIAM H. MAY.